Nov. 10, 1931.  C. ELLIS  1,830,872
COMPOSITION AND METHOD OF MAKING DELINEATED AREAS
Filed Sept. 23, 1927
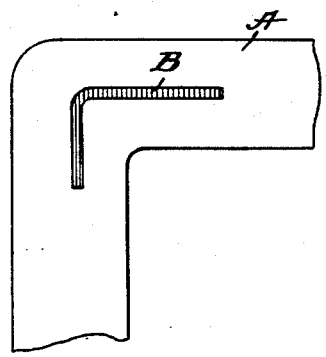
Carleton Ellis  Inventor
By  Sol Shappirio
   His Attorney Patented Nov. 10, 1931

1,830,872

UNITED STATES PATENT OFFICE

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA

COMPOSITION AND METHOD OF MAKING DELINEATED AREAS

Application filed September 23, 1927. Serial No. 221,622.

This invention relates to processes of delineating lines of traffic on highways such for example as oiled macadam roads and to delineated areas resulting from such process, and relates particularly to a procedure which permits of the treatment of highways to afford white or light colored dots, lines or other markings of a character more permanent than that secured by the present method of painting the surfaces of highways.

The present method of painting the surface of roads along curves, cross-roads and other places dangerous to traffic involves a number of difficulties. When the paint is applied to a surface containing considerable road oil or black tar, the seepage of this oil through the surface of the paint quickly discolors it and the lines are soon darkened to such an extent as to be practically obliterated. Another objection is that the mineral oil mixing with the drying oil of the paint retards the drying of the latter. For these and other reasons the employment of paints for the delineation of lines of traffic is not only expensive and troublesome, but the markings thus produced are not permanent enough to be dependable.

The drawing shows a plan view of a highway carrying a marker delineating a traffic line in accordance with the present invention.

The present invention eliminates the troubles and difficulties incident to the painting methods, and resides in the use of white or light colored cement materials desirably formed into slabs adapted to be inserted into the surface of the highway. For these purposes white Portland cement is desirably used, and when the white color is to be enhanced substances having a pigment effect may be used. Zinc oxide for example may be used with the Portland cement for this purpose. Among other materials that may be used for this purpose are lithopone and titanium oxide. With the cementing agent there may be mixed any suitable kind of a filler such as white sand or other mineral filler or fibrous material to give strength such as asbestos or sawdust. Crushed quartz or white quartz sand which is sharp is adapted for use in connection with the materials mentioned above.

When desired, a waterproofing agent such as calcium or zinc stearate or other so-called metallic soap or other form of waterproofing agent may be incorporated with the cement.

The compositions described above exhibit the property of shedding oil and this is particularly desirable in connection with the present invention, since road oil frequently is found on the highway. But several expedients are available if desired for increasing the oil shedding properties of these materials. Possibly the most effective way of keeping oil out of the composition is to make it very dense, that is, to use a high content of the cement and fill all of the voids. This expedient may be utilized by increasing the cement content of the upper layer of the insert or delineated area.

The materials specified are used to best advantage by excavating the highway to form a shallow depression say one or two inches in depth, although it may be made deeper if desired to secure a better anchorage. The depression or depressions may take the form of the usual geometrical shapes now employed, if so desired. Thus for example circular shapes arranged in series along the road or bands of appropriate width with square or rounded ends may be used or continuous bands extending along the middle of the road around the entire curve or at cross roads and so forth may be employed. In short, any appropriate shape effective for the purpose may be used. The composition used may be trowelled into the cavities and the surface smoothed to make a white tile or placque in the road, desirably flush with the surface thereof.

While the above given method is preferred, it is possible to insert pre-formed tiles of such cement into the roadway. This method however gives more difficulty in securing a good anchoring surface. However should such method be desired it is best to put a bed of cement in the cavity before laying the tile and insert the latter in the soft cement allowing it to set in place.

When desired an oxychloride cement composition such as that described in my specification Serial No. 743,782 filed October 15, 1924, can be cast into strips, disks, tiles, etc., and these cast articles may be set here and there in the Portland cement composition, preferably spaced well apart, so that for example, the surface may exhibit an area of approximately equal amounts of each material. The brilliant white color of the oxychloride cement particularly lends itself to treatment of this character.

When necessary, the tile or placque or casting can be reinforced with wire and also anchoring wires or rods may project through the lower part of the white indicator down into the roadway for some distance in order to lodge the said indicator in the road-bed more firmly.

In the case of ordinary concrete roads the insert-markers may be laid at the time the concrete is put in place or cavities may be left by means of forms which are subsequently filled in with the white cement after the surrounding aggregate has set.

In the drawing there is shown diagrammatically, a curved highway A, carrying a traffic delineation B along the center line of the curve of the highway A, acting to delineate the lines of traffic into two lanes, the traffic delineation B being made in accordance with the present invention from the compositions hereinabove set forth, and preferably including the Portland cement type of composition having the property of shedding road oil.

The insert-markers may be cleaned occasionally by scraping or grinding or by washing with a scouring composition. Furthermore the invention does not preclude painting the surfaces of such markers from time to time if desired.

Another feature which may be carried out in connection with the present invention is that of incorporating at least in the top layer of the marker a substance such as mica or other material which glistens so that the surface of the marker will appear very noticeable when it receives the illumination from headlights. A further elaboration of this is to insert in the wet cement composition a series of red bulls-eyes or pieces of glass cut with facets which will shine when light impinges thereon, and thus form an effective danger signal. In such elaborations of the invention it may prove desirable to use a base or foundation of cheap cementing material, and employ the white or light colored compositions of this invention for the upper and exposed portions.

In connection with this invention, it is to be understood that the exact procedure set forth above, and the specific compositions enumerated are given as illustrative only and not as limiting, since they are capable of substantial variation by those skilled in the art.

The problem to be solved it will be noted differs essentially from that involved in connection with compositions used for making curbing, etc., since permanent delineation is not a requisite in such cases, nor is there the same tendency for road oil, etc. to obliterate the effect of the composition. The compositions set forth above however, are particularly desirable for the purposes indicated, that is for highway delineation, due to their properties of being highly water resistant and of not readily absorbing road oil.

Having thus set forth my invention, I claim:

1. A delineated area of the highway having cavities of geometrical design filled with a white or light colored Portland cement composition, the amount of cement in the composition being sufficient to yield a dense material not readily permeable by road oil.

2. A delineated area of the highway having a cavity thereof filled with a white or light colored composition containing Portland cement and zinc oxide, the proportions of cement and zinc oxide being sufficient to yield a material not readily permeable by road oil.

3. An insert-marker for highway delineation consisting of Portland cement and white sand, the proportions of cement and white sand in the upper surface of the marker being sufficient to yield a material of such density that it is not readily permeable by road oil.

4. A delineated area of a highway having a cavity thereof filled with a light colored composition containing Portland cement, said area carrying an insert made from an oxychloride cement composition.

CARLETON ELLIS.